United States Patent [19]

Engibarov

[11] Patent Number: 5,056,766

[45] Date of Patent: Oct. 15, 1991

[54] PRECISION MACHINE VISE

[76] Inventor: Eddy Engibarov, c/o E.Z.E. Machine Company-616 Onderdonk Ave., Ridgewood, N.Y. 11385

[21] Appl. No.: 367,376

[22] Filed: Jun. 16, 1989

[51] Int. Cl.[5] .......... B23Q 3/02

[52] U.S. Cl. .......... 269/136; 269/101; 269/138; 269/157; 269/217

[58] Field of Search .......... 269/101, 136, 138, 157, 269/160, 190, 217, 234

[56] References Cited

U.S. PATENT DOCUMENTS

| | | | |
|---|---|---|---|
| 2,667,799 | 2/1954 | Rzepela | 269/138 |
| 3,565,417 | 2/1971 | Degle | 269/136 |
| 3,785,635 | 1/1974 | Lassy et al. | 269/136 |
| 4,406,445 | 9/1983 | Seidel | 269/136 |
| 4,643,411 | 2/1987 | Izumi | 269/138 |

*Primary Examiner*—J. J. Hartman

*Attorney, Agent, or Firm*—Helfgott & Karas

[57] ABSTRACT

A vise for use with a machining table having an elongated T-slot in its upper surface includes a stationary jaw and a jaw support transversely extending over the T-slot and clamped against the table in spaced relation to one another by a clamping device centrally extending through the jaw and jaw support into the T-slot. A movable jaw is mounted on the jaw support with its gripping surface facing the gripping surface of the stationary jaw and its opposite surface inclined to the table. A wedge member having an inclined surface conforming to the inclined surface of the movable jaw is located between the movable jaw and the jaw support. Adjustment of the vertical position of the wedge member relative to the table enforces a horizontal motion of the movable jaw to grip a work piece located between the jaws. An auxiliary base member with a T-slot in its upper surface is also provided upon which the vise may be alternatively mounted for portable free-standing use.

19 Claims, 3 Drawing Sheets

PRECISION MACHINE VISE

The invention relates to vises, and more particularly to precision machine vises used to retain work pieces during machining operations such as milling, grinding, drilling and tapping operations.

BACKGROUND OF THE INVENTION

Precision machine vises are usually made of hardened steel with jaws of precision flat gripping surfaces, and are designed to exert great clamping force relative to their size on a gripped work piece. It is important that this great clamping force be applied as uniformly as possible over the entire gripping surfaces, and that there be minimum sidewise, lengthwise or vertical deflection of either jaw when the work piece is gripped.

Such precision machine vises may also be free standing for portable multiple use, or may be designed to be assembled on, or attached to, the machining table of a machine tool. Such machining table is typically made of hardened steel and has a perfectly flat upper surface containing a plurality of spaced parallel channels of inverted T-shape cross-section, conventionally called T-slots. When a vise is used with such machining tables, it is important that the vise not only be easy to assemble on the table, but also that it may be maintainable in a completely stationary position on the table while a gripped work piece is being machined.

The conventional type of precision machine vise utilizes a flat, relatively heavy base which houses a rotatable helically threaded shaft upon which a movable jaw is threaded. Rotation of this shaft causes the movable jaw to move on the base toward or away from a stationary jaw formed with or attached to one end of the base. The clamping force depends primarily upon the tightness of shaft rotation as well as the precision and ruggedness of the helical threads and accommodating grooves on the shaft and movable jaw. The clamping force is normally greatest in the region of the jaws adjacent the shaft, but becomes somewhat less in regions of the jaws remote from the shaft. In addition, this clamping force may suddenly reduce if the tightness of shaft rotation decreases due, for example, to vibration of the jaws during a machining operation.

The degree of jaw deflection depends to a considerable extent upon the amount of play in the bore of the base accommodating the rotatable shaft as well as in the grooves of the movable jaw accommodating the threads of the shaft. Over time, this deflection may become greater as the vise becomes worn and this play increases. Moreover, if this vise is used on a machining table, some auxiliary means must be provided for clamping the base of the vise in a completely stationary manner on the table.

SUMMARY OF THE INVENTION

Accordingly, it is an object of the invention to provide a precision machine vise in which the clamping force does not depend upon the rotation of a shaft and is unusually high for a given size of vise.

Another object is to provide a vise in which the clamping force is virtually uniform throughout the entire gripping surfaces of the gripping jaws, and the jaws have virtually no deflection in any direction when a work piece is gripped between the jaws and machined.

A further object is to provide a precision machine vise in which the conventional heavy base may be eliminated, and the vise jaws directly supported and mounted on a machining table of the type having T-slots in its upper surface.

Alternatively, the heavy base may be provided as an auxiliary part, allowing the vise to be used as a portable, free standing tool.

In accord with the general invention, means are provided, slideable within a T-slot of a machining table, for firmly clamping a first jaw and a jaw support for a second jaw in two spaced apart stationary positions against the table. A second jaw is mounted on the jaw support for movement relative to and facing the first jaw. The two opposing faces of these jaws are preferably flat and extend parallel to one another. This second movable jaw and its support likewise have opposing surfaces extending in directions generally parallel to the jaw faces, but with at least one of these opposing surfaces being in a plane inclined to the table. An elongated wedge member having opposite sides conforming to these opposing surfaces is located between, and biased to press contiguously against, these opposing surfaces. Means are also provided to adjust the position of this wedge member in a vertical direction toward and away from the table and thereby, through the wedging action of the contiguous inclined surfaces, to adjust the horizontal gripping position of the movable second jaw relative to the stationary first jaw.

The stationary first jaw and the support for the movable second jaw have flat bottom surfaces that are firmly clamped against the flat upper surface of the machining table in a manner such that there is a strong adhesive effect between these conforming surfaces and virtually no possibility of movement or deflection of these stationary parts. Moreover, since the movement of the movable jaw is the result of the wedging action of a wedge member which has its opposite side riding against this stationary support, there is likewise virtually no possibility of deflection of the movable jaw while the jaws are gripping a work piece.

The clamping force exerted between the jaws resulting from this wedging action is also positive and direct and very great for a given size of vise. It is also uniformly transmitted to the jaws over the entire region of the wedged surfaces.

In accord with a specific feature of the invention, the means for clamping the movable support against the table, as well as the means for adjusting the vertical position of the wedge member relative to the machining table, comprises a clamping member of T-shape cross-section which slideably fits within the T-slot of the table, and into which bolts which centrally pass through the jaw support and the wedge member are threaded. When these bolts are tightened, the jaw support may be clamped against the table and the wedge member may be drawn toward the table.

In accord with another feature of the invention, the jaw support is rectangular and the means for mounting the movable jaw on this jaw support comprises a pair of legs attached to opposite ends of this movable jaw and slideably contained as a snug fit within guiding channels on opposite sides of the jaw support. A rod is attached to the rear of the legs and extends across the rear of the jaw support. This rod together with the legs and the second jaw thus form a rectangular yoke which completely surrounds the jaw support. The two legs also extend beyond the front of the jaw support, and the second jaw thus extends across the front of the jaw support in spaced relation thereto. This second jaw is thus horizontally movable in the direction of the guiding side channels but is rigidly supported against lateral deflection. The wedge member is located in this space between the rear of the second jaw and the front of the jaw support. A spring located between the rear of the jaw support and the adjacent rod of the surrounding yoke biases this second jaw toward the support and against this intermediate wedge member.

In accord with a further feature of the invention, the bolt for adjusting the vertical position of the wedge member extends through the center of the wedge member, and a pair of springs are each located between the wedge member and the table surface at opposite end regions of the wedge member, thereby to bias the wedge member away from the table against the constraint of the central bolt. In this way the possibility of vertical deflection of the wedge member is reduced, and the forces exerted by the wedge member against the second jaw are equalized throughout the length of the wedge member.

In accord with a still further feature of the invention, all the components of the vise, namely, the first jaw, the jaw support and the second jaw with its mounting yoke are rectangularly shaped and of the same width which is made equal to the distance between adjacent T-slots of the machining table. These components of the vise are all centrally clamped to the table directly over one of the T-slots so that additional similar vises may be similarly centrally located over adjacent slots and stacked against the original vise. In this way, the stacked vises will support one another against lateral movement, and the gripping jaws of the two or more stacked vises will all be aligned and able to cooperate in the gripping of an elongated work piece.

A rectangular metal base having a central T-slot may also be provided upon which all the components may alternatively be mounted in order to convert the vise into a portable, free-standing tool.

DETAILED DESCRIPTION OF THE INVENTION

The novel features of the invention are set forth in the appended claims. The invention itself, together with further objects and advantages thereof nay best be understood by reference to the following description, taken in conjunction with the accompanying drawings, in which:

Figure 1:
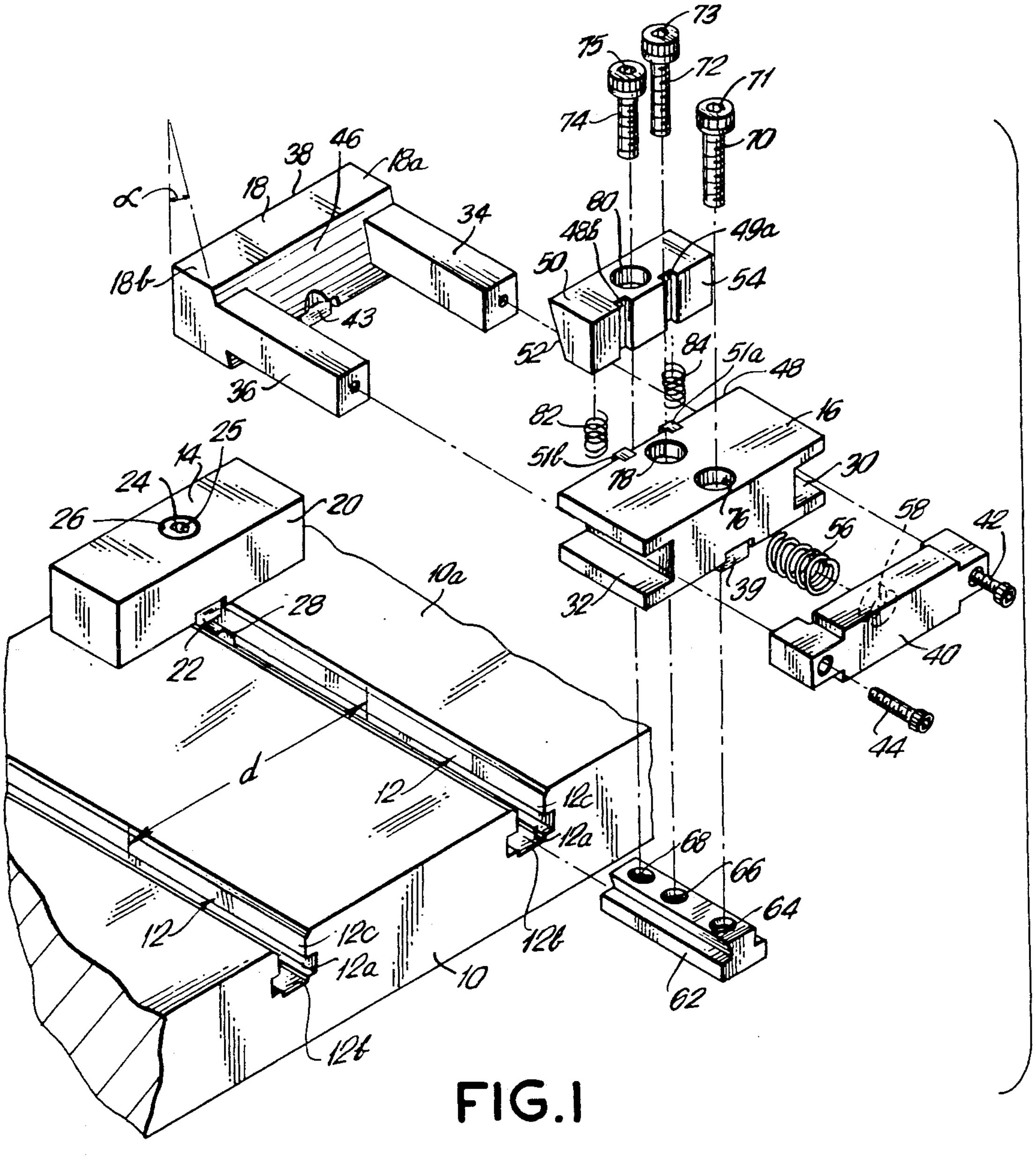
FIG. 1 is an exploded perspective view of the precision machine vise of the invention as applied to a machining table of the type having parallel T-slots in its upper surface.
Figure 2:
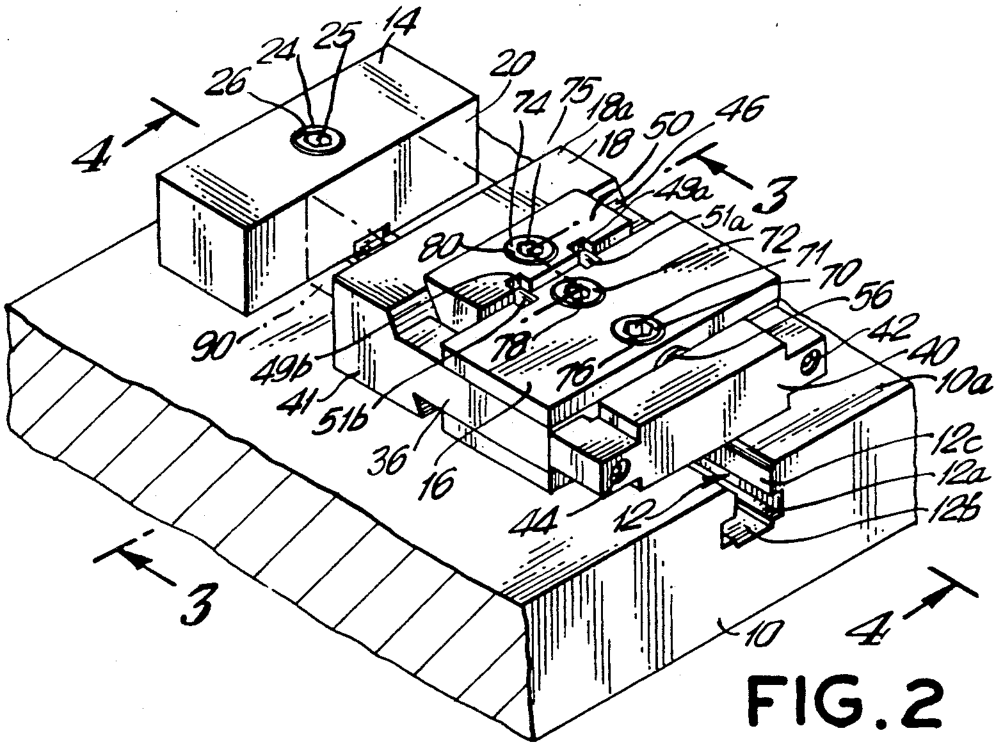
FIG. 2 is a corresponding perspective view showing the vise in assembled condition on the table.

Referring now to FIGS. 1 and 2, there is shown a machining table 10 of the type having a plurality of spaced parallel T-slots 12, such tables being usually supplied or available as part of a machine tool such as a milling or grinding machine. T-slots 12 typically have a wider base region 12*a* of rectangular cross-section, an additional bottom channel 12*b* of slight depth, and a narrow neck region 12*c* extending from its base region 12*a* to the upper surface of the table 10.

The principal components of the vise of the invention are centrally clamped against the table 10 over one of the T-slots and comprise a first jaw 14, a jaw support 16 and a second jaw 18 slideably mounted on the jaw support 16 for horizontal movement relative to the first jaw 14. Jaw 14 is a rectangular block, preferably of hardened steel, and is centrally positioned over T-slot 12 with its gripping face 20 transverse to the T-slot 12 and perpendicular to the upper surface 10*a* of table 10. Jaw 14 preferably has a square-cornered ridge 22 of small depth extending across its bottom central region which snugly fits within and against the sides of the top portion of the neck region 12*c* of T-slot 12. This ridge 22 insures that jaw 14 and its jaw face 20 are positioned transversely at precise right angles to the T-slot 12.

Figure 4:
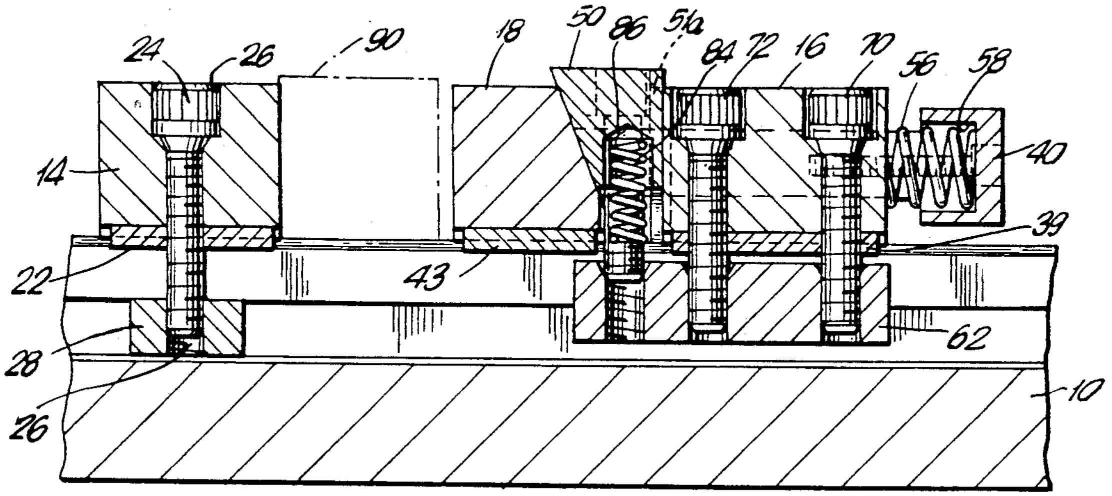
FIG. 4 is a longitudinal sectional view taken along line 4—4 of FIG. 2 showing the vise with the stationary jaw and the jaw support for the movable jaw in clamped position against the table prior to the wedged gripping by the jaws of a work piece.
Figure 5:
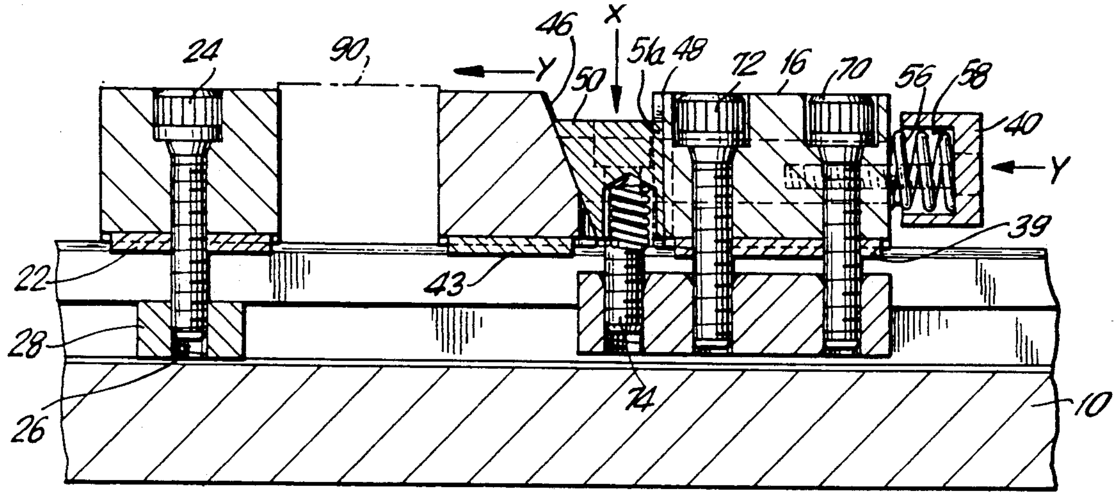
FIG. 5 is a corresponding longitudinal sectional view showing the jaws moved into the wedged position gripping a work piece.

The means for clamping jaw 14 against table 10, best seen in FIGS. 4 and 5, comprises a bolt 24 extending through a central hole 26 in jaw 14 and threaded into a square nut 28 contained as a snug fit within the wider region 12*a*of the T-slot. Bolt 24 has an enlarged head with a central socket 25 shaped to accommodate an Allen wrench. As bolt 24 is rotated and tightened, nut 28 is raised against the shoulders of the T-slot defining the intersection between the base and neck regions 12*a*, 12*c* of the T-slot, and jaw 14 is clamped firmly down against the table 10. Once the jaw 14 is clamped in place against the table 10, it constitutes the stationary jaw of the vise, and it is not ordinarily necessary to move it again while a series of work pieces are gripped by the vise and machined. Thus, for more permanent applications, jaw 14 may, if desired, be formed integrally with the table 10.

The jaw support 16 also constitutes a rectangular-shaped metal block which overlies and extends transverse to the T-slot 12 in spaced apart relation to the stationary jaw 14. The outer sides of this jaw support 16 have square-cornered channels 30, 32 which slideably accommodate a pair of legs 34, 36 of corresponding square cross-section. Legs 34, 36 are formed integrally with, or otherwise attached to, opposite end regions 18*a*, 18*b* of the second jaw 18. Jaw 18 thus extends across the front of jaw support 16 with its front gripping face opposite and parallel to the gripping face 20 of stationary jaw 14. A rod 40, preferably also of rectangular cross-section, extends across the rear of jaw support 16 and is attached at its opposite ends to the rear of legs 34, 36 by such means as fastening bolts 42, 44. It will be appreciated that jaw 18, legs 34, 36 and rod 40 constitute a sturdy rectangular yoke 41 which completely surrounds and is slideably supported on jaw support 16. Jaw support 16 and jaw 18 also have respective square-cornered ridges 39 and 43 of small depth extending from their bottom central regions which fit within and against the sides of the upper neck portion 12*c* of T-slot 12.

Legs 34, 36 are made somewhat longer, for example, about three quarters of an inch longer than the width of jaw support 16 such that jaw 18 may be moved on jaw support 16 to a position spaced a short distance from the front of jaw support 16. The rear surface 46 of jaw 18 and the front surface 48 of jaw support 16 both extend in directions parallel to the gripping faces 20, 38 of jaws 14 and 18 and transverse to the T-slot 12. However, in accord with the invention, at least one of these surfaces 46 or 48 is inclined relative to the surface of the table 10. In the drawings, the rear surface 46 of jaw 18 is shown as being so inclined, while the front surface 48 of jaw support 16 is shown as being perpendicular to the table 10.

In accord with the invention, a wedge member 50 is located between and in contact with these surfaces 46, 48. Wedge member 50 also centrally overlies and extends transverse to the T-slot 12 and has opposite sides 52, 54 whose angular inclinations relative to the table 10 conform to the inclinations of the corresponding surfaces with which they are in contact. Specifically, the front side 52 of wedge member 50 is inclined to the same degree as the rear surface 46 of jaw 18 so that the two inclined surfaces 46, 52 conform to and mate with one another. The rear side 54 of wedge member 50 is perpendicular to table 10 thereby to conform to the perpendicular front surface of jaw support 16. A spring 56 located within a recess 58 in the side of rod 40 extends between the rod 40 and the rear surface 60 of jaw support 16, and serves to bias the yoke 41 containing the jaw 18 rearwardly, thereby to hold wedge member firmly between surfaces 46 and 48. In order to retain the wedge member in a vertical orientation and prevent skewing, a pair of slots **49*a* and 49*b* are provided within the wall 54. Correspondingly mating keys 51*a* and 51*b* are provided projecting from surface 48**.

The means for clamping the jaw support 16 against table 10 in a desired position, as well as to provide adjustment of the vertical position of wedge member 50, comprises an elongated clamping member 62 of inverted T-shape cross-section conforming to the cross-section of T-slot 12. Member 62 may be slideably inserted within T-slot 12 to any desired position and has three spaced threaded recesses 64, 66, 68 along its upper surface into which bolts 70, 72, 74 may be threaded. Bolts 70 and 72 have enlarged heads with central sockets 71, 73, are located within two spaced holes 76, 78 along a centerline of jaw support 16, and are respectively threaded into recesses 64, 66 of clamping member 62. When these bolts 70, 72 are tightened, the clamping member 62 is raised against the shoulders of the T-slot and the jaw support 16 is drawn downwardly by the enlarged heads of the bolts 70, 72 to become clamped firmly against the upper surface **10*a* of table 10. Ridge 39 at the bottom of jaw support 16 helps maintain jaw support 16 in precise right-angle transverse position relative to T-slot 12 while it is clamped against table 12**.

Figure 3:
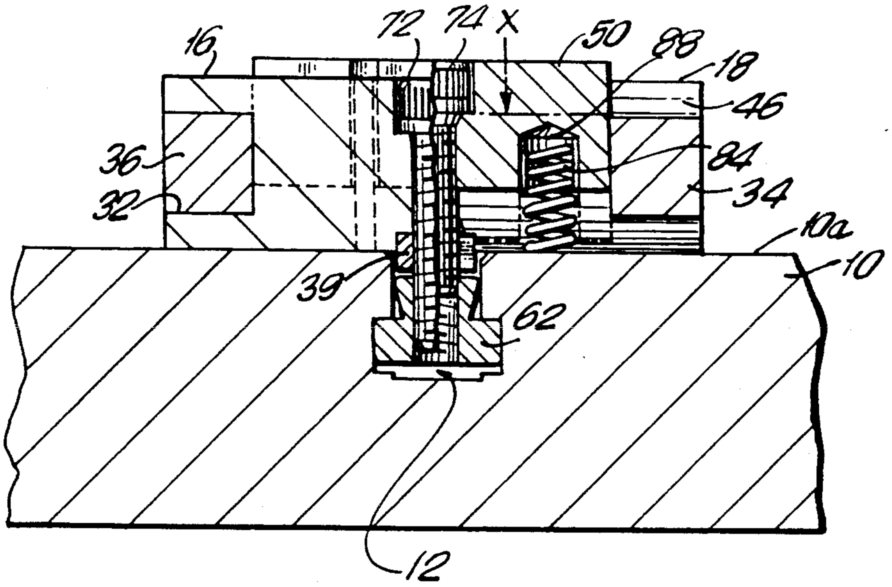
FIG. 3 is a transverse sectional view taken along broken line 3—3 of FIG. 2 showing the clamping means for the jaw support and the vertical adjusting means for the wedge member.

The third bolt 74 is somewhat longer than bolts 70, 72 and likewise has an enlarged head with a central socket 75. It is located within a corresponding central hole 80 of wedge member 50 and threaded within the third recess 68 of T-shaped member 62, as best seen in FIGS. 3, 4, and 5. Wedge member 50 also has a pair of equivalent springs 82, 84 located within a pair of shallow recesses 86. 88 extending upward from the bottom surface of opposite end regions of the wedge member equidistant from the central hole 80. These springs 82, 84 are considerably longer than the depth of these recesses 86, 88 end thus protrude beyond the bottom surface of wedge member 50 to press against the surface of table 10. As bolt 74 is tightened within the threaded recess 68, wedge member 50 is drawn vertically toward the table 10 against the upward force of the compressing springs 82, 84. Since these springs 82, 84 are equidistant on opposite sides from the central bolt 74, they serve to maintain wedge member 50 perfectly horizontal as the vertical position of the wedge member 50 is adjusted.

All of the components of the vise associated with jaw support 16 and movable jaw 18 are first preassembled before being mounted on table 10. The legs 34, 36 attached to movable jaw 18 are inserted within channels 30, 32 of jaw support 16, and rod 40 is attached to the ends of legs 34,36 while spring 56 is seated within recess 58 and trapped between rod 40 and the rear of jaw support 16. Bolts 70, 72, and 74 are then inserted through their respective holes in jaw support 16 and wedge member 50 and partially threaded within threaded recesses 64, 66, and 68 of clamping member 62. This entire preassembly is then turned over so that the recesses 86, 88 of wedge member 50 face upwardly, the movable jaw 18 is moved forwardly against the compression of spring 56, and the wedge springs 82,84 are dropped into the wedge recesses 86, 88. The movable jaw 18 is then released to move rearwardly under the force of spring 56, and the inserted wedge springs 82, 84 are trapped in place within their accommodating recesses 86, 88 by the bottom region of the rear inclined surface 46 of movable jaw 18.

In assembling and operating the vise on the table 10, bolt 24 is inserted through hole 26 of the stationary jaw 14 and partially threaded into nut 28. The stationary jaw 14 is then mounted on table 10 by slideably inserting the nut 28 and the exposed lower portion of bolt 24 within T-slot 12, and moving jaw 14 to its desired position on table 10. Bolt 24 is then rotated to tighten nut 28 within T-slot 12 and to clamp jaw 14 against the table 10. A work piece, indicated by broken line 90, may then be placed on the table against the gripping surface of jaw 14.

The entire preassembled movable jaw and jaw support assembly is then mounted on the table 10 as a unit by slideably inserting the clamping member 62 and the exposed lower portions of bolts 70, 72, and 74 within T-slot 12 until the gripping surface 38 of the movable jaw 18 is brought closely adjacent to the rear of the work piece 90, as shown in FIG. 4. The bolts 70, 72 of jaw support 16 are then rotated within their threaded recesses 64, 66 to tighten clamping member 62 against the walls of T-slot 12, and to firmly clamp jaw support 16 against the table in this position. At this stage of the operation of the vise, springs 56, 82 and 84 are fully distended, and the third bolt 74 is only partially threaded within the third recess 68 of the clamping member 62 so that wedge member 50 has its bottom surface a considerable distance away from the surface of table 10, as shown in this FIG. 4.

In order to grip work piece 90, it is then only necessary to rotate bolt 74 within its threaded recess 68 and thereby force wedge member 50 downwardly toward table 10. The wider portion of wedge member 50 is thus brought in contact with the lower region of the rear inclined surface of the movable jaw 18, thereby causing the movable jaw to move forwardly and to clamp against the work piece 90, as shown in FIG. 5. The vertical force caused by the downward motion of wedge member 50, as indicated by arrow X, is thus transmitted as horizontal clamping force, as indicated by arrow Y. As is well known, the degree of force transmitted partially depends upon the inclination of the inclined mating surfaces relative to the horizontal table 10. If this inclination is between 45 and 90 degrees, the enforced horizontal motion of jaw 18 will be less than the applied vertical motion of the wedge member 50, but the transmitted clamping force will be correspondingly amplified and thus be greater than the downwardly applied force. It has been found that an angle of inclination for inclined mating surface 46 with respect to vertical surface 38, as shown by angle and should be within a range of 12° to 45°, and preferably at 24°, such angle provides sufficient horizontal movement together with considerable force amplification.

The width of the stationary jaw 14, the movable jaw 18 and the jaw support 16 may all be conveniently made equal to, or slightly less than, the distance d between adjacent T-slots so that identical additional vises my be mounted over adjacent T-slots and stacked against, or adjacent to, one another, thereby to cooperate in gripping an elongated work piece along its length.

Figure 6:
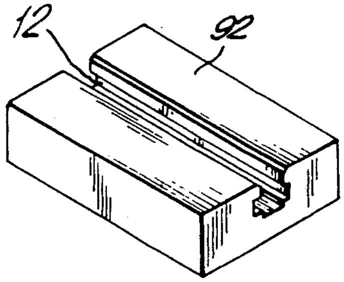
FIG. 6 is a perspective view of a metal base for the vise.

Although the vise of the invention has been described above for use with a slotted table of a machine tool, it may also be used as a multipurpose portable vise by merely providing an additional flat rectangular metal base 92, as shown in FIG. 6. The width of base 92 is preferably made equal to, or slightly larger than, the width of jaws 14 and 18, and the length of the base 92 is preferably made long enough to accommodate all of the assembled components of the vise together with an inserted work piece. Base member 92 has a central longitudinally extending T-slot similar to the T-slot of table 10. The components of the vise may be assembled and operated on this base 92 in the same manner as described above in connection with table 10. The combination may then be used as a portable and free standing vise in any location for many purposes.

It will be appreciated that the above described vise does not depend upon the rotation of a shaft, but rather generates its clamping force directly and positively as the result of the vertical movement of a wedge member acting through mating inclined surfaces to uniformly enforce the horizontal clamping movement of a movable jaw over substantially its entire gripping surface. The stationary jaw 14 and the jaw support 16 are firmly clamped in place on table 10 with virtually no lateral deflection not only because of the direct clamping force of the tightened bolts 24, 70 and 72, but also because of the friction and adhesive effect between their fairly extensive bottom surfaces and the surface of table 10, as well as by the stabilizing effect of the bottom ridges 22 and 39 fitting within and against the sides of the neck region of T-slot 12. Lateral deflection of the movable jaw is likewise minimized not only by the rigid support of the yoke construction slideably mounting the jaw 18 on the jaw support 16, but also by the direct pressure of the wedge member located between the stationary jaw support 16 and the movable jaw 18, as well as by the stabilizing effect of the bottom ridge 41 which fits snugly against the sides of the neck region of T-slot 12.

The vise is also relatively easy to mount on a machining table of the type having a T-slot, and may also be used together with a separate slotted base as a portable multipurpose and free standing vise.

Although one particular embodiment of the invention has been set forth herein, many modifications may be made, and it is intended by the appended claims to cover all such modifications as fall within the general scope and spirit of the invention described.

I claim:

1. A vise for use with a machining table having a flat upper surface and at least one elongated T-slot in said upper surface, comprising a first vise jaw movable within said elongated T-slot to any desired position on said table, first clamping means within said T-slot for clamping said first jaw in a first stationary position on said table, a second vise jaw, a jaw support for supporting said second vise jaw, second clamping means within said T-slot for clamping said jaw support in a second stationary position on said table spaced from said first jaw, means for mounting said second jaw on said jaw support for movement relative to said first jaw in the direction of said T-slot, said mounting means on said second jaw horizontally surrounding said jaw support said jaw support and said second jaw having opposing surfaces extending transverse to said T-slot, at least one of said opposing surfaces being in a plane inclined to said upper surface of said table, a wedge member inserted between said opposing surfaces and having opposite sides conforming in inclination to, and pressing against said opposing surfaces, and means for adjusting the position of said wedge member in a direction perpendicular to said upper surface of said table, thereby to adjust the position of said second jaw relative to said first jaw, wherein said second jaw is biased toward said jaw support by a biasing means acting between said second support mounting means and said jaw support in the direction of the slot.

2. The vise of claim 1 wherein said biasing means is a spring.

3. The vise of claim 2 wherein the means for mounting said second jaw on said jaw support comprises a rectangular yoke peripherally surrounding said jaw support, said biasing spring being located on the opposite side of said support from said second jaw.

4. The vise of claim 3 wherein said yoke has opposite side legs, and said jaw support has opposite side channels slideably accommodating said side legs of said yoke and guiding the movement of said second jaw relative to said support.

5. The vise of claim 1 wherein said first and second jaws have opposing surfaces extending transverse to said T-slot and perpendicular to said upper surface of said table.

6. The vise of claim 1 wherein said second clamping means for said jaw support comprises a clamping member of inverted T-shape cross-section slideable as a snug fit within said T-slot, and at least one bolt extending through a central region of said jaw support, said clamping member having a threaded recess in its upper surface for receiving said bolt.

7. The vise of claim 6 wherein said means for adjusting the position of said wedge member in a direction perpendicular to said table comprises a bolt extending through a central region of said wedge member, and said clamping member has an additional threaded recess in its upper surface for receiving said wedge bolt.

8. The vise of claim 7 also comprising means for spring biasing said wedge member away from said table against the constraint of said wedge bolt threaded to said clamping member.

9. The vise of claim 8 wherein said wedge member spring biasing means comprises a pair of springs located between said table and said wedge member on opposite sides of said central wedge bolt.

10. The vise of claim 1 wherein one of said opposing surfaces is in a plane perpendicular to said table, and the other of said opposing surfaces is in said plane inclined to said table with the portion of said inclined surface adjacent said table being closer to said opposing perpendicular surface than the portion of said inclined surface remote from said table.

11. The vise of claim 10 wherein said inclined surface is at an angle greater than 45 degrees and less than 90 degrees relative to the surface of said table.

12. The vise of claim 11 wherein said inclined surface is at an angle of between 12° and 45° relative to the vertical surface perpendicular to said table.

13. The vise of claim 10 wherein said jaw support has said perpendicular surface and said second jaw has said inclined surface.

14. The vise of claim 1 wherein said first jaw and said jaw support each have a square-cornered central ridge respectively extending from its bottom surface as a snug fit into said T-slot, thereby to help stabilize said first jaw and said jaw support against lateral movement when said first jaw and said jaw support are clamped in their stationary positions on said table.

15. The vise of claim 14 wherein said second jaw also has a central square-cornered ridge extending from its bottom surface to help stabilize said second jaw against lateral movement during operation of said vise.

16. The vise of claim 1 wherein said table has a plurality of parallel spaced T-slots, and said first jaw, said jaw support, and said second jaw are each centrally mounted on said table over said one T-slot, and each have a width dimension equal to a width of the flat upper surface.

17. The vise of claim 16 wherein said width dimension is substantially equal to the distance between adjacent T-slots of said table, whereby a plurality of similar vises may be stacked alongside one another over adjacent T-slots of said table.

18. The vise of claim 16 also comprising a separate rectangular base member having a width approximately equal to said width dimension, and having a central longitudinal T-slot in its upper surface, whereby said vise may alternatively be mounted on said base member or said table.

19. The vise of claim 12, wherein said angle is 24°.

* * * * *